Patented July 7, 1925.

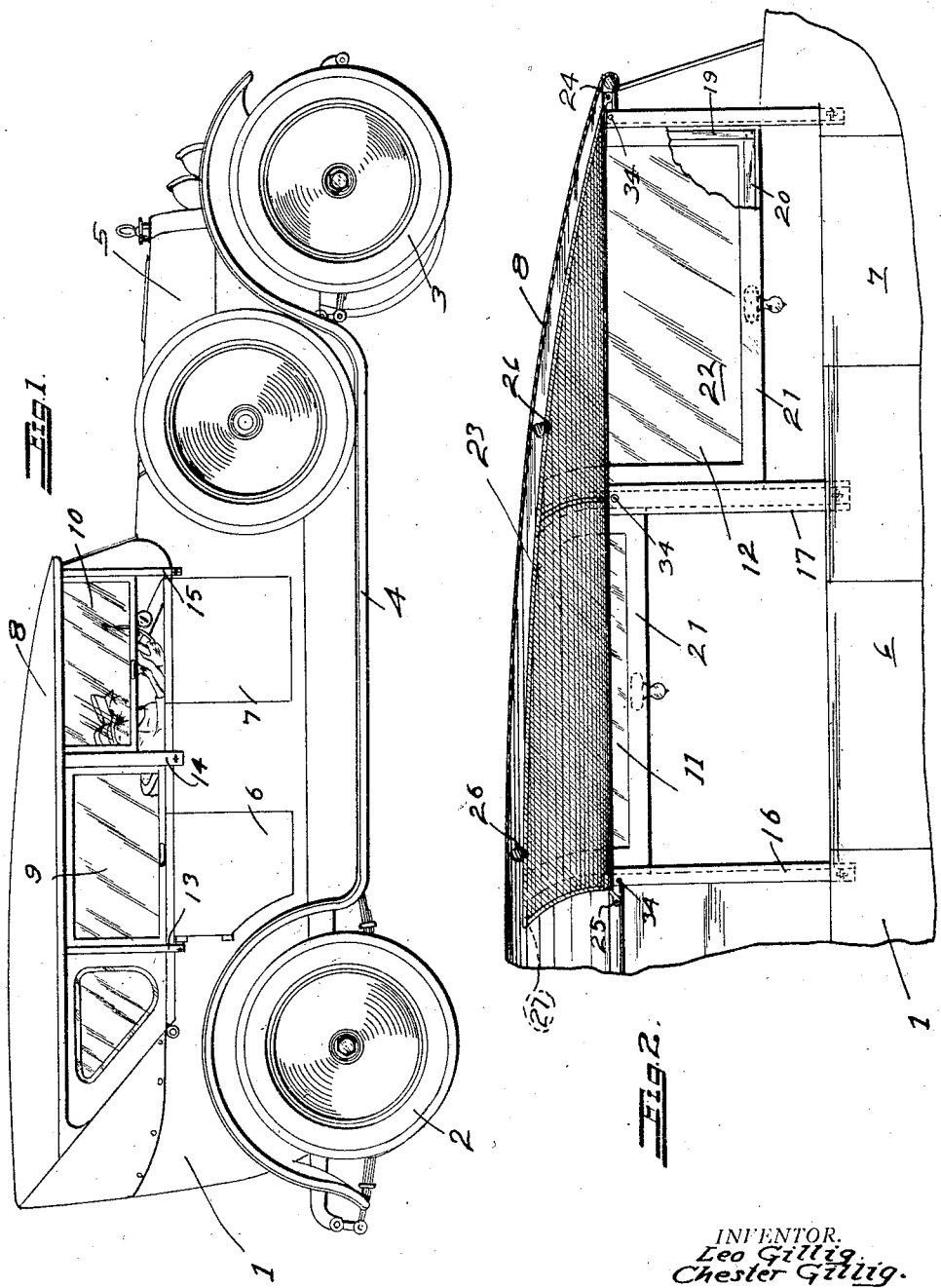

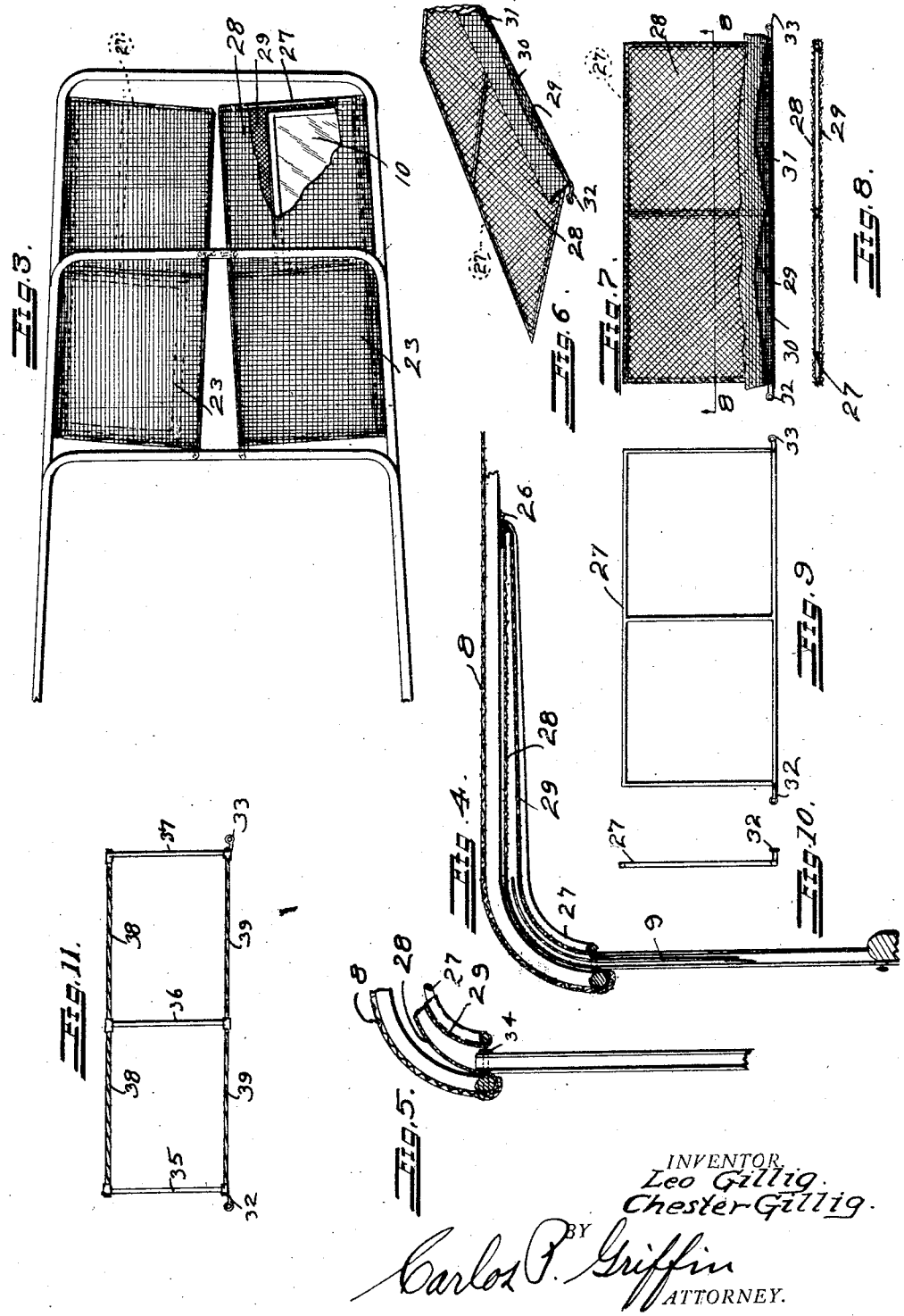

1,544,830

UNITED STATES PATENT OFFICE.

LEO GILLIG AND CHESTER GILLIG, OF SAN FRANCISCO, CALIFORNIA.

COMBINED GUIDE AND ENVELOPE FOR AUTOMOBILE SIDE CURTAINS.

Application filed September 2, 1920. Serial No. 407,646.

*To all whom it may concern:*

Be it known that we, LEO GILLIG and CHESTER GILLIG, citizens of the United States, residing at San Francisco, in the county of San Francisco, State of California, have invented new and useful Combined Guides and Envelopes for Automobile Side Curtains, of which the following is a specification, in such full and clear terms as will enable those skilled in the art to construct and use the same.

This invention relates to combined guides and envelope for automobile curtains and appertains more particularly to guides and envelopes for flexible side curtains applied to folding automobile tops, and an object of the invention is to provide adequate guiding means for the curtain as it is pushed up in the top of the automobile and at the same time conceal the curtain from view.

Another object is to construct the guides and envelope so that it can be made up as a unit and attached to any automobile top simply by bending it to suit the curve of the top and fastening with screws or bolts.

Another object is to make part of the frame of the envelope flexible so that it will fold with the automobile top, and a further object is to simplify the construction of this class of curtain attachments for automobile tops so as to reduce the cost of manufacture, but, of course, when the top is folded up the curtains are removed from the flexible envelope.

A further object of the invention is to produce a guide for the side curtains of an automobile top which can be made up in flat units on the shop table and then bent to fit the given top, the frame forming the guides being of a yieldable material and covered with a material to conceal the curtain when the latter is raised.

Another advantage of this type of curtain and guide envelope is that it may be easily applied to almost any set up top, the frames fitting under the plane of the bows in the top.

Another object of the invention is to provide means whereby when the curtains are raised they will be properly guided, concealed and held out of contact with the automobile top fabric.

Other objects of the invention will appear as the description proceeds.

An embodiment of the invention is shown in the accompanying drawings in which the same reference numeral is applied to the same portion throughout, but we are aware that there may be modifications thereof.

Figure 1 is a side elevation of an automobile showing the application of the invention.

Fig. 2 is a sectional view of a portion of the top showing the combined guides and envelope in place.

Fig. 3 is a plan view of a portion of the automobile top frame showing the fabric envelopes with a portion broken away to show one of the flexible curtains therein.

Fig. 4 is a transverse sectional view of one side of the top and showing the fabric envelope in section, and one of the flexible curtains partly raised.

Fig. 5 is a sectional view taken adjacent one of the vertical curtain guides showing method of pivoting the upper end of the guide to the automobile top frame.

Fig. 6 is a perspective view of one of the envelopes as made up and before it is bent into shape conforming to the curve of the automobile top.

Fig. 7 is a side view of one of the envelopes.

Fig. 8 is a section on line 8—8 of Fig. 7.

Fig. 9 is a side elevation of the frame of the envelope before the fabric is attached.

Fig. 10 is an edge view of same.

Fig. 11 is a side elevation of a modified form of frame for the envelope.

The numeral 1 represents the body of an automobile with wheels 2 and 3, running board 4, and hood of the engine 5.

The doors are shown at 6 and 7. The top 8 shown in this instance is adapted to fold compactly back of the rear seat in the well known way.

Sliding curtains 9 to 12 inclusive are provided and are adapted to slide in the vertical guides 13 to 18 inclusive. The curtains consists of a frame with flexible vertical side bars 19 joined by rigid bars 20 top and bottom. This frame is covered by a flexible material, like leather, as indicated at 21, and serves to hold a window 22 of flexible transparent material.

To guide and conceal the curtains when they are pushed up, an envelope 23 is provided and attached to the frame of the automobile top by means of screws 24-25 and 26 or other suitable means.

The envelope consists of a frame 27 made preferably of soft iron so that it can be bent to conform to the curve of the top.

On this frame two separate thicknesses of fabric 28 and 29 are stretched and stitched together around the edges, but leaving two openings 30 and 31 to receive the curtains, ample room being allowed so that the curtains will slide freely therein.

Projecting lugs 32 and 33 with holes for screws are provided for attaching the envelope to the top frame.

The vertical guides 13 to 18 inclusive are each pivoted on bolts 34 which pass through the bow of the frame as shown.

The modified form of envelope frame consists of soft iron rods 35, 36 and 37 joined by flexible links 38 and 39 of webbing or other suitable material, in this instance rope is shown. The fabric is placed on this frame in the same manner as described for frame 27. This construction allows the envelope to fold with the automobile top.

What we claim is as follows, but various modifications may be made in the construction shown in the drawings and above particularly described form, within the purview of our invention.

1. A detachable guide and envelope for automobile side curtains, comprising a frame of yieldable material covered by two layers of fabric with openings between said layers of fabric to guide and receive automobile side curtains, and means to secure the frame to an automobile top.

2. A detachable guide and envelope for automobile side curtains, comprising a frame consisting of side bars and a center bar of yieldable material joined by top and bottom members of flexible material, the said frame being covered by two layers of fabric stitched around the edges to said frame, leaving openings at one edge into which side curtains can slide, and means to secure the frame to an automobile top.

3. A device of the class described for automobile side curtains comprising in combination an automobile top with open sides, vertical guides connecting the top and body of the automobile, flexible curtains adapted to slide in said vertical guides for closing said open sides, an envelope having an upper and lower fabric for guiding and receiving said curtains as they are raised in said vertical guides and means to secure said envelope to the underside of the automobile top.

4. A device of the class described for automobile side curtains comprising in combination an automobile top with open sides, vertical guides connecting the top and automobile body, flexible curtains adapted to slide in said vertical guides for closing said open sides, a detachable frame carrying a double fabric envelope for guiding and receiving said curtains as they are raised from said vertical guides and means to secure said envelope to the underside of the automobile top.

5. The combination with a folding automobile top of a flexible frame connected thereto thereunder, a fabric covering for said flexible frame adapted to produce a pocket to guide and receive a curtain, vertical guides aligned with the open edge of said pocket and connecting the body and top, and curtains slidable in the pocket and vertical guides.

6. The combination with an automobile top of a flexible frame connected therewith thereunder, said frame being capable of being folded up with the top, a fabric cover for said frame adapted to produce a pocket to guide and receive a curtain, vertical guides aligned with the open edge of said pocket connecting with the body and top, a flexible curtain slidable in the pocket and vertical guides, and foldable with the pocket when the automobile top is folded.

7. The combination with an automobile top of a flexible frame bent to fit under the outer portion of the top and secured thereunder, a fabric covering for said frame adapted to produce a pocket to guide and receive a curtain, and flexible curtain slidable in the pocket.

8. The combination with an automobile top of a flexible frame bent to fit the outer curve of the top and secured thereto thereunder, a fabric covering on both sides of said frame producing a pocket to guide and receive a curtain, other guides connecting the top and automobile body, and curtains slidable in said guides and capable of being concealed within said pocket when not in use.

In testimony whereof we have hereunto set out hands this 27th day of August A. D. 1920.

CHESTER GILLIG.
LEO GILLIG.